United States Patent Office 3,738,991
Patented June 12, 1973

3,738,991
LATEX COMPOSITIONS
Delmer H. Reed, South Charleston, W. Va., assignor to Union Carbide Corporation, New York, N.Y.
No Drawing. Filed May 13, 1971, Ser. No. 143,209
Int. Cl. C08f 29/46, 37/18
U.S. Cl. 260—296 RW
3 Claims

ABSTRACT OF THE DISCLOSURE

There is described herein an acrylic latex having enhanced adhesion by the incorporation therein of an amine salt of a copolymer of ethylene and acrylic acid. Better wet adhesion characteristics are described when a small amount of wax is incorporated into the latex. The latex may be employed in the manufacture of paints, sealants, caulks and mastics.

---

This invention relates to modifications of acrylic latices to enhance the adhesion thereof to a variety of substrates. More particularly, this invention involves the addition of a water dispersible ethylene-acrylic acid salt copolymer to acrylic latices to provide therein increased amounts of carboxyl groups such that the resulting latices possess increased adhesion to a wide variety of substrates, such as glass, metal, wood, ceramic, other organic materials, and the like. Still further, this invention relates to the aforesaid modifications of acrylic latices which can be employed in the manufacture of coating compositions, mastics, caulks and sealants exhibiting enhanced adhesion to a wide variety of substrates and other superior properties. A further embodiment of this invention is a caulk and sealant formulation comprising the aforesaid latex modification and, in addition thereto, a solid wax, to provide significantly improved cured film wet adhesion.

Acrylic latices employed in the manufacture of coating, sealant, mastic and caulking compositions are based upon alkylacrylate copolymers. Such copolymers typically contain at least 50 weight percent alkyl acrylate, such as ethyl acrylate, n-propyl acrylate, n-butyl acrylate and i-butyl acrylate. The preferred alkyl acrylate is, of course, ethyl acrylate. The remainder of the copolymer, that is, the remaining 50 weight percent of the copolymer is derived from such co-monomers as an alkyl acrylate different from the basic alkyl acrylate, such as described previously, styrene, methylmethacrylate, acrylonitrile, acrylic acid, methacrylic acid, itaconic acid, maleic acid, N-methylolacrylamide, vinyl acetate, vinyl chloride, gamma-hydroxypropylacrylate, beta - hydroxyethylacrylate, glycidyl acrylate, and in particular, mixtures of the above. The preferred acrylic copolymers produced in the form of the latices, and employed herein, comprise, typically at least 60 weight percent of the alkyl acrylate and 40 weight percent of the other co-monomer components. Such latices are formed by reaction of the monomeric components which form the copolymer, in water under agitation and in the presence of surfactants and a catalyst to initiate polymerization of the monomers. Usually, the catalyst is a peroxide catalyst. The surfactants may be anionic, non-ionic and cationic. The art is replete with teachings of the manufacture of such copolymers. The term copolymer as employed herein includes a polymer derived from the polymerization of two ethylenically unsaturated monomers, three ethylenically unsaturated monomers, four ethylenically unsaturated monomers, and so on. Thus, the term copolymer as employed herein is to be construed as a polymer derived from the polymerization of at least two ethylenically unsaturated monomers such as described above. In the preferred characterization of this invention, the latices employed in the practice of this invention are those derived from the monomers described above, in the proportion cited.

It is well recognized that a latex coating composition such as those employed in the trade paint field and the industrial coatings field should possess good adhesion to a variety of substrates. The degree of adhesion is extremely important to the utility of the material. A coating composition which has excellent adhesion to a given substrate will generally wear longer, protect the underlining surface longer and show less film defects upon aging. Adhesion is also a very significant factor in the mastic, caulking, and sealant areas. Mastics are typically employed as coatings about piping and joints to protect the materials therebelow. A good mastic must possess extensibility characteristics, it must be water-insoluble, it should possess good ultraviolet light resistance such as 500 hours under intense ultraviolet light without significant change in properties, and the latex employed in the manufacture of the mastic should possess good pigment binding efficiency. A significant difference between a mastic, caulk and sealant is usually the amount of filler employed in combination with the latex. Usually, a sealant and caulk will contain considerably more filler than a mastic composition. The properties discussed above with respect to the mastic are also important in caulks and sealants. Caulks and sealants serve the purpose of filling holes in a solid surface or to join two similar or dissimilar surfaces such as, metal to metal, metal to glass, metal to wood, wood to glass, glass to glass, and the like. An important feature of a caulk or sealant is that it should not shrink when cured. For if they do shrink, they will either disfigure or damage the article to which they have been applied.

This invention involves the incorporation into an acrylic latex, such as described above, a copolymer of ethylene and acrylic acid in the form of a monofunctional amine salt. The ethylene-acrylic acid copolymers employed in the practice of this invention contain 14 to 54 weight percent acrylic acid, based on the total weight of the copolymer. The remaining weight of the copolymer is ethylene (—CH$_2$CH$_2$—). It is characterized as having a melt index of at least 0.1 to about 1000 decigrams per minute, determined at 190° C. A critical characteristic thereof is that the amine salt of said copolymer is water dispersible. This means that when the amine salt is added to water, it can be suspended therein either as a molecular dispersion, such as a solution, or as a particulate dispersion. However, such dispersion should be stable, i.e., the amine salt should not readily precipitate from a state of suspension in the water. The amine salts are formed by mixing the ethylene-acrylic acid copolymer as aforedefined, with a secondary or tertiary monoamine such as the following: dialkyl secondary monoamines, such as, dimethyl amine, diethyl amine, di-n-propylamine, di-i-propyl amine, di-n-butylamine, di-i-butylamine, methylethylamine, methyl-n-butylamine, and the like; heterocyclic secondary amines, such as, piperidine, morpholine, pyrrole, imidazole, and the like; sec alkanol amines, such as N-methylethanolamine, N-ethylethanolamine, N-n-propylethanolamine, N - benzylethanolamine, N-phenylethanolamine, N-n-butylethanolamine, N-isopropylethanolamine, N-cyclohexylethanolamine, N - methylpropanolamine, N-ethyl-n-propanolamine, and the like; tertiary amines, such as, trimethylamine, methyldiethylamine, triethylamine, tri-n-propylamine, tri-i-propylamine, tri-n-butylamine, dimethyl cyclohexylamine, benzyl dimethylamine, phenyl diethylamine, pyridine, N-methylpiperidine, N-methylmorpholine, N,N-dimethylethanolamine, N,N-diethylethanolamine, N,N-di-n-propylethanolamine, N,N-dimethylpropanolamine, N,N-di-n-butylpropanolamine, and the like.

In the usual case, the ethylene-acrylic acid salt copolymer comprises from about 0.2 to about 10 weight percent, based upon the weight of the resin solids of the mixture of the ethylene-acrylic acid salt copolymer and the acrylic latex. In the preferred practice of this invention, the amount of ethylene-acrylic acid salt copolymer provided in combination with the latex constitutes at least 0.5 weight percent to about 5 weight percent, same basis described above. However, it should be understood that the solids content does not take into consideration other materials which might be present in the mixture, such as nonvolatile surfactants, nonvolatile plasticizers, and any other nonvolatile material which is not a chemical part of the acrylate copolymer or the ethylene-acrylic acid salt copolymer.

The incorporation of the ethylene-acrylic acid salt copolymer in to the acrylic latex is very simply effected. If the latex copolymer is acidic, the preferred manner for incorporating the ethylene-acrylic acid salt copolymer thereto is to incrementally and with care, add an aqueous dispersion, typically an aqueous dispersion containing from about 20 weight percent to about 50 weight percent of the ethylene-acrylic acid amine salt therein, to a stirred, warmed latex. Desirable, the temperature of the latex is at least about 40° C., preferably at least 50° C. and usually not more than about 85° C. After all of the desired amount of the ethylene-acrylic acid salt is provided in the latex, then the latex can be gradually cooled to room temperature (such as 20-27° C.). However, if the latex is basic, that is, has a pH in excess of 7, the ethylene-acrylic acid salt copolymer can be incrementally added, with care, at essentially room temperature to the latex.

If the ethylene-acrylic acid salt copolymer causes precipitation to the latex, that is, coagulation of the latex particles, during addition, then one should increase the temperature at which addition is being effected and reduce the rate at which the ethylene-acrylic acid salt copolymer is introduced to the latex. Furthermore, during addition of the ethylene-acrylic acid salt copolymer to the latex, the latex should be carefully stirred. Increasing the degree of agitation during such addition to the latex will enhance the ability to incorporate the ethylene-acrylic acid salt copolymer in the latex.

Without wishing to be bound to any theory, it is believed that the ethylene-acrylic acid salt copolymer when added to the latex performs in the following manner: If the latex to which the copolymer is to be added is acidic, it is believed that the acidic nature of the latex causes a precipitate of the ethylene-acrylic acid salt copolymer to be formed. However, the precipitate does not drop out of solution because of the temperature of the latex during its incremental addition thereto. It is believed that the copolymer becomes finely dispersed as extremely discrete particles within the latex in a state of suspension in the water phase thereof and becomes attracted to the latex particles. This attraction causes the ethylene-acrylic acid salt copolymer to become affixed to the latex particles either as a coating thereabout or as a particle bonded thereto in the form of a very discrete agglomerate. As a result, the ethylene-acrylic acid copolymer is held in the latex without causing coagulation of the latex polymer. However, when the latex is basic, then it is believed that the basic ethylene-acrylic acid amine salt copolymer remains suspended in the aqueous phase of the latex without coating or agglomerating with the latex particles.

In any case, when the eventual film is formed by depositing a layer of the latex, usually formulated with fillers and other materials, upon a surface, and the water therein is evaporated, the latex particles become fused with the ethylene-acrylic acid particles.

The amount of the carboxy groups of the ethylene-acrylic acid copolymer which is provided in the salt form in order to effect dispersion thereof in water is not necessarily equivalent to the total number of all of the carboxy groups of the copolymer. Thus, when the copolymer is converted to the salt form, only that amount of the carboxy groups of the copolymer is formed into salt which is sufficient to render the copolymer capable of stable suspension when mixed with water. A minimum standard with respect thereto is that enough of the carboxy groups are converted to the amine salt such that the resulting ethylene-acrylic acid copolymer is capable of stable suspension, without precipitation, when dispersed with stirring in water in amounts to form a 32.5 weight percent copolymer aqueous dispersion, then determined at 25° C. Such dispersion may be formed by heating the water before the addition of the ethylene-acrylic acid amine salt copolymer. In respect to the formation of such copolymer salts and the nature of their composition, reference is made to copending U.S. application Ser. No. 763,926, filed Sept. 30, 1968 and U.S. Pat. No. 3,445,362.

In order to formulate the mixture of the acrylic latex and the ethylene-acrylic acid salt copolymer into one of a coating composition, a sealant composition, a caulking composition and a mastic composition, there is blended with this mixture other materials, each of which lends, with respect to the particular type of composition to be produced, certain desirable properties.

For example, in any one of these types of compositions one would always add a filler. A filler is a finely particulate material which serves to either pigment—in this respect it can act to a color or add hiding power to the composition when converted into a film—or extend the composition—adds to the viscosity control and the general bodying characteristics of the material when applied either as a coating, a mastic, a sealant or a caulk. Any of the conventional materials employed as fillers in the art can be employed in the practice of this invention. Thus, one may add a filler in varying proportions which acts as a pigment. Suitable pigments used in the practice of this invention include, by way of example, titanium dioxide (either rutile or anatase), iron oxides, zinc oxides, lead oxide, as well as the various coloring pigments, such as the various chromates and organic pigments which provide a desired color to the composition. In addition, one may employ extender fillers, such as calcium carbonate, calcium oxide, siliceous such as hydrated silica, fume silica, alumina silicate, calcium aluminum silicates, magnesium aluminum silicates, silica aerogels, silica xerogels, asbestos, mica, and the like. The amount employed in the composition of this invention is dependent upon the particular use of the latex-copolymer salt mixture. In general, in any of these uses, the composition typically will contain filler, in the form of a pigment or extender, ranging from about 10 to about 65 weight percent, based on the total weight of the composition. When utilizing the latex-salt copolymer mixture in the manufacture of a mastic the amount of filler usually employed, mainly of the extender variety, ranges from about 10 weight percent to about 45 weight percent. When the same mixture is employed in the manufacture of a paint, then the amount of filler therein will range from about 10 weight percent to about 35 weight percent based on the total weight of the composition. When the mixture is employed in manufacturing a sealant or a caulk, the amount of filler therein will range from about 20 weight percent up to 65 weight percent, based on the total weight of the composition. The reason for larger quantities of filler in the latex mastics, caulks and sealants is that in such compositions the amount of water contained therein is typically less than is contained in a latex paint composition.

In paints, mastics, sealants and caulks, one typically adds a liquid ingredient which serves the purpose of enhancing the flow or leveling characteristics of the composition when it is applied to a surface onto which it is to be cured. For example, in a paint formulation one would employ a material which has solvating powers with respect to the acrylic copolymer resin contained therein so as to enhance its flow or leveling characteristics when it is applied as a film upon a substrate. Such materials which possess solvating powers when employed in paints are usually volatile materials such that they eventually evaporate out of the film and no longer remain as a component thereof. On the other hand, in mastics, sealants and caulks, the component which is added for the purpose of enhancing the flow or leveling characteristics is a material which is also a palsticizer for the eventually cured composition. Such plasticizers are materials which are relatively non-volatile in that they, over a long period of time, will be left within the cured mastic, sealant or caulk composition after it has been applied and subjected to either elevated temperatures or ambient temperature conditions to effect cure. Such materials are provided in the composition up to about 10 weight percent based on the total weight of the composition. Suitable solvating materials which enhance the flow characteristics of the latex paint composition possess some hygroscopicity, that is, it has some attraction for water and hence does not become an incompatible component in the latex composition. Illustrative of such solvating components, are, for example, the various ester and ether glycols, such as, the mono- or di-methyl, ethyl, n-propyl, and the like, ethers of ethylene glycol, diethylene glycol, and the mono- or di-esters of the same glycols, wherein the acyl groups thereof are, for example, acetyl, propionyl, and the like. Also suitably employable are mixtures of mono-ether and mono-esters of the various ethylene glycols illustrated above, such as for example, monoacetyl ester of the monomethyl ether of ethylene glycol, and the like. Also suitably employed for such purposes is 2,2,4-trimethyl-1,3-pentanediol monoisobuterate.

Illustrative plasticizers which can be employed in mastics, sealants, and caulks, include, by way of example, the long chain alkyl phthalate esters, long chain alkyl adipate esters, the long chain alkyl phosphate esters, tricresyl phosphate, tri(butoxyethoxy)phosphate, dipropylene glycol dibenzoate, and the like. With respect to the phthalates, adipates and phosphates, the ester moieties are derived from long chain alcohols containing at least 8 carbon atoms such as n-octyl, 2-ethylhexyl, undecyl, dodecyl, and the like.

Paints, mastics, caulks and sealants may contain materials which enhance the viscosity of the composition. For example, one frequently adds to a paint a thickener which serves the purpose of increasing the viscosity of the composition and hence enhancing its brushability for use in making thin coatings. In most cases, the thickeners employed in the composition of paint compositions are ethyl cellulose, carboxymethyl cellulose, and hydroxy ethyl cellulose. Other materials of course can be employed for such purposes, such as polyacrylic acid, inert extenders such as asbestos, bentonite clays, and natural gums.

There is generally provided in the compositions of this invention conventional biocides which serve the purpose of enhacing the mildew resistance of the cured composition. Known biocides include those of the mercury class, the chlorinated phenols, and the quaternary amines. Any of the conventional biocides in the art may be employed.

If desired, during the formulation of the compositions of this invention one may employ a filler dispersant to enhance the dispersion the filler components in the composition. Illustrative of such filler dispersants are, by way of example, the sodium polyphosphates and the various polymeric organic acids which are sold for such purposes. The selection of fillers dispersants is well within the skill of the routine worker in the art and the particular selection, will, of course, be governed by the particular selection of filler, the latex employed and the particular affect which the formulator seeks.

One may also add to the composition the usual antifoamers such as, trimethylsilyl end-blocked polydimethylsiloxane and the aliphatic hydrocarbon antifoamers. One may also incorporate fire retardants into the composition, such as antimony oxide in combination with one of a variety of chlorinated compounds such as chlorinated hydrocarbons. The particular selection of these ingredients which go to the ultimate property of the finally cured products are well within the skill of the routine formulator. In many cases the selection of these particular ingredients goes not to the advantages of any particular one of them but to the ingredient of choice for a particular purpose based upon the skill of the formulator and his experience.

In a further embodiment of this invention, particularly with respect to the manufacture of sealant and caulk compositions, a uniquely desirable component to be added is wax. It has been determined that in a sealant formulation employing the acrylate latex-ethylene-acrylic acid salt copolymer mixture that when one adds wax to a formulation, in which fillers and other ingredients are a part, the resulting composition has better adhesion to a wide variety of substrates such as wood, glass, ceramic tile, steel, aluminum and the like. This better adhesion is particularly noted when the caulk or sealant is cured on such substrate and the substrate is immersed in water for extended periods of time such as seven days. The result is that the wax containing sealant or caulk possesses uniquely better adhesion or resistance to the effects of water on the adhesive interface between the cured sealant or caulk composition and the substrate. The amount of wax which is added to the composition to effect such a result is relatively small, for example, as little as about 0.2 to as much as about 2 weight percent of the wax solids based on solids weight of total composition, may be incorporated into the composition to effect enhanced wet adhesion. Preferably, one employs from about 0.35 weight percent to about 1 weight percent of the wax in the sealant or caulk composition. Waxes which may be employed in the practice of this invention, include, by way of example, carnauba wax, paraffin wax, microcrystalline waxes, the chlorinated hydrocarbon waxes, and, in general, the various vegetable, mineral and petroleum waxes. Most particularly preferred is carnauba wax.

The wax is typically converted into an emulsion and such emulsion is incorporated into the total latex composition. Usually, such emulsions contain a relatively small amount of wax therein generally not exceeding about 20 weight percent of the emulsion and typically more than about 5 weight percent of the emulsion. Such emulsions are formed by blending a soap in water and incorporating the wax with rapid agitation in the soap solution.

In order to illustrate further characterizations of this invention, there is offered the following examples which are not intended in any way to limit the scope of this invention.

EXAMPLE I

The purpose of this example is to demonstrate the compatibility of an ethylene-acrylic acid salt copolymer in two distinct different acrylate latices. The components which were mixed are characterized as follows:

Salt copolymer

An aqueous dispersion of a copolymer of ethylene (80.5 weight percent) and acrylic acid (19.5 weight percent) in which 40% of the carboxy groups therein are neutralized by salt formation with N,N-dimethylethanolamine; the copolymer has a melt index, at 190° C. of 250 decigrams per minute and the dispersion contains 30 weight percent resin solids constituting the ethylene-acrylic acid copolymer and 32.5% of non-volatile which includes the resin solids plus N,N-dimethylethanolamine.

Acrylate Copolymer Latex A

A latex formed by the copolymerization of 93 parts by weight of ethyl acrylate, 5 parts by weight of styrene, 2 parts by weight of glycidyl acrylate, 3 parts by weight of itaconic acid; having a total solids of 50% by weight, a pH of 3.15, a viscosity in centipoises at 20° C. of 293.

Acrylate Copolymer Latex B:

A latex formed by polymerizing 70 parts by weight of ethyl acrylate, 28.5 parts by weight of methylmethacrylate, and 1.5 parts by weight of methacrylic acid, containing 46% by weight solids, a pH of 9.5, a viscosity determined in centipoises at 20° C. of 50.

To a beaker containing 90 parts by weight of Acrylate Copolymer Latex A, heated to 56° C., is incrementally fed 10 parts by weight of the Salt Copolymer described above. The addition was effected over a period of about 5 minutes. During such addition, the latex was stirred wth a spatula. Stirring was continued until all of the salt copolymer was added and the mixture cooled to approximately room temperature. The mixture was compatible in that no coagulation of the latex took place as a result of the addition of the salt copolymer. When a sample of the mixture was poured onto a plate glass sheet beside another sample of the Acrylate Copolymer Latex A and both film on the glass were dried, the mixture possessed better adhesion and less surface tackiness than the acrylate copolymer latex alone. This result is also noted when both samples were similarly compared on aluminum, wood and steel.

Into a beaker was added 90 parts by weight of Acrylate Copolymer Latex B. Then the salt copolymer was incrementally added over a five minute period with continuous agitation. In this particular case, the latex was not preheated and was kept at room temperature. This procedure was taken because the latex had a pH of 9.5. When the mixture was poured out on a variety of surfaces and directly compared with latex B alone in each case there was noted an improvement in adhesion and less surface tackiness.

EXAMPLE II

The latex employed in this example was formed by the emulsion polymerization of 9 parts of ethyl acrylate, 4 parts by weight of acrylonitrile, 1 part by weight of N-methylol acrylamide, and 2 parts by weight of acrylic acid; had a total solids content of 60 weight percent, pH of 6.25, and a viscosity in centipoises of 15 determined at 20° C. The aforedescribed latex is characterized hereafter as "Acrylate Copolymer Latex C."

Portions of Acrylate Copolymer Latex C in the amounts indicated in the Table I were heated to 55° C. and with stirring there was incrementally added to each Table I. Each mixture was casted as a 0.008 mil film on portion an amount of salt copolymer as specified in glass and dried by evaporation of the contained water.

There is described in the following examples the use of a 180° peel adhesion test. The equipment employed in that test is an Instron Tensile Tester, an aluminum mold having dimensions of 6" long x 1" wide x .025" in thickness, a substrate which is free of formed particles, 1" strips of desized, grade-A airplane fabric (4.2 ounces per yard, 80/84 thread count), a broad knife or a spatula, and a razor blade. The test procedure for effecting the 180° peel adhesion is as follows:

The aluminum mold is placed on the substrate in such a manner that one end of the substrate will fit into the jaws of the Instron Tensile Tester. The mixture or coating material, such as the aforedefined mixtures (caulks, paints, mastics or sealants), is applied to the substrate with a spatula to the thickness of the mold, leaving a smooth surface. The mold is removed and a strip of airplane fabric is placed on the mixture surface. The fabric should be long enough to cover the length of the film at 180°, and have enough left over to fit into the Instron Jaws. The mold is placed over the fabric and around the film of the mixture. Additional mixture is applied over the fabric surface inside the mold. By means of the spatula, or broad knife, apply slight pressure and screed the mixture until the fabric is about ½ the depth to the substrate and it is covered with a smooth film. Remove the mold and allow the film to cure about three days at room temperature, seven days at 80° C. in a forced air oven, then recondition one day at room temperature. (When other cure conditions are employed below they shall be noted). The cured specimens of compound are then cut, along the outer edges of the fabric, to the substrate in 1-inch width sections. The specimen is then placed in the Instron Tensile Tester and the cloth is pulled back over on itself at 180° and fitted into the separation jaws. The rate of separation of the jaws of the Instron is maintained at 2" per minute, with a chart speed of 1 inch per minute. The values are recorded in pounds per inch.

EXAMPLE III

Mixtures of Acrylate Copolymer Latex C and the salt polymer, as defined in Example II, were made in the proportions cited in Table II. Table II characterizes a plurality of 180° peel adhesion evaluations of various combinations of Acrylate Copolymer Latex C and salt copolymer on pinewood, glass and aluminum as well as salt copolymer alone and Acrylate Copolymer Latex C alone.

TABLE 1

| Ingredient | | Weight used, grams | Percent by weight of mixture | Observation of cast film on glass |
|---|---|---|---|---|
| (a) | Acrylate Copolymer Latex C | 1,500 | 95 | Film is clear good qualitative adhesion to glass. |
| | Salt copolymer | 78.9 | 5 | |
| (b) | Acrylate Copolymer Latex C | 1,500 | 85 | Do. |
| | Salt copolymer | 264.7 | 15 | |
| (c) | Acrylate Copolymer Latex C | 800 | 50 | Film is cloudy, good qualitative adhesion to glass. |
| | Salt copolymer | 800 | 50 | |
| (d) | Acrylate Copolymer Latex C | 166.6 | 10 | Do. |
| | Salt copolymer | 1,500 | 90 | |

The mixtures of Acrylate Copolymer Latex C and salt copolymer were made in accordance with the procedure of Example II.

TABLE 2.—180° PEEL ADHESION [1]

| Film composition | Substrate | Tensile, p.i. | Type of film failure |
|---|---|---|---|
| a. Salt copolymer, alone | Pinewood | 5 | Adhesive. |
| b. Acrylate Copolymer Latex C, alone | do | 18 | Cohesive. |
| c. Mixture of Acrylate Copolymer Latex C with 7.4% salt copolymer | do | 16 | Do. |
| d. Mixture of Acrylate Copolymer Latex C with 9.7% salt copolymer | do | 30 | Do. |
| e. Mixture of Acrylate Copolymer Latex C with 50% salt copolymer [2] | do | 8 | Do. |
| f. Mixture of Acrylate Copolymer Latex C with 5% salt copolymer | Glass | 5.5 | Adhesive-cohesive. |
| 7. Mixture of Acrylate Copolymer Latex C with 7.4% salt copolymer | do | 18 | Cohesive. |
| 8. Mixture of Acrylate Copolymer Latex C with 9.7% salt copolymer | do | 28 | Do. |
| 9. Mixture of Acrylate Copolymer Latex C with 15% salt copolymer [2] | do | 9 | Adhesive-cohesive. |
| 10. Mixture of Acrylate Copolymer Latex C with 50% salt copolymer [2] | do | 5 | Do. |
| 11. Mixture of Acrylate Copolymer Latex C with 90% salt copolymer | do | 3.5 | Do. |
| 12. Acrylate Copolymer Latex C, alone | do | 12 | Cohesive. |
| 13. Mixture of Acrylate Copolymer Latex C with 7.4% salt copolymer | Aluminum | 18 | Do. |
| 14. Mixture of Acrylate Copolymer Latex C with 9.7% salt copolymer | do | 28 | Do. |
| 15. Mixture of Acrylate Copolymer Latex C with 50% salt copolymer [2] | do | 28 | Do. |
| 16. Acrylate Copolymer Latex C, alone | do | 14 | Do. |

[1] The films were cured 24 hours at 77° F. at 50% relative humidity, one hour in a 70° C. forced air oven and reconditioned 24 hours at 77° F. at 50% relative humidity.
[2] These films were cloudy.

EXAMPLE IV

A mixture of salt copolymer (of Example I) and Acrylate Copolymer Latex C in a weight percent ratio of 5/95 was formed, weighing 1,217.4 grams. It was made according to the procedure of Example II and was employed in the following mastic formulation:

TABLE 3

| Ingredients | Weight in grams | Percent by weight of total composition |
|---|---|---|
| Mixture | 1,217.4 | 64.39 |
| Sodium hexa-meta phosphate | 5.6 | 0.30 |
| Asbestos (short fibers) | 22 | 1.16 |
| Mica | 254.4 | 13.45 |
| TiO₂ (rutile) | 17.6 | 0.93 |
| Chlorinated hydrocarbon wax (70% chlorine) | 39.6 | 2.09 |
| Antimony oxide | 3 | 0.16 |
| Diatomaceous silica | 124.2 | 6.58 |
| Clay filler | 86.4 | 4.57 |
| Tricresyl phosphate | 111.8 | 5.91 |
| Phenyl mercury acetate | 4.0 | 0.21 |
| Anti-foamer | 4.8 | 0.25 |

The aforementioned mastic formulation was made by blending the ingredients in a Baker-Perkins Sigma blade mixer. The aforementioned mastic formulation when evaluated on the following substrates provided in each case excellent adhesion:

| Substrate | Tensile, p.i. | Reason for failure |
|---|---|---|
| Aluminum | 25 | Cohensive failure. |
| Steel | 20.5 | Do. |
| Pinewood | 15.7 | Do. |
| Glass | 25.0 | Do. |
| Ceramic | 20.0 | Do. |

EXAMPLE V

In this example, Acrylate Copolymer Latex C and the salt copolymer are blended together as described in Example II to form a mixture consisting of 90.3 weight percent of Acrylate Copolymer Latex C and 9.7 weight percent of salt copolymer.

The mixture and the other components listed in the Table 4 are formed by adding the various components, in the order listed, with mixing and continuing the mixing for two hours in a 1 gallon Baker-Perkins Sigma Blade type mixer operating at 79 revolutions per minute.

Properties of Formulations A, B and C

| | |
|---|---|
| Total solids | 83.2 |
| Color | White |
| Package stability, 30 days at 50° C | Pass |
| Freeze-thaw, stability after 5 cycles | Pass |
| Consistency,¹ gallons per minute | 221 |
| After 4 days at 158° F., gallons per minute | 218 |
| Tack-free time, minutes | 30 |
| Cure-through time, days | 2–3 |
| Bleeding or staining² at— | |
| 73° F | None |
| 158° F | None |
| Slump, channel | None |
| Right angle (glass, aluminum, wood) | None |
| Gunability after 1 week storage at— | |
| 32° F., 81% R.H | Good |
| 30° F., 26% R.H | Good |
| Shore A Hardness: | |
| 14 days at 73° F., 50% R.H | 11 |
| 1,092 hours in "Weather-Ometer" | 23 |
| Color and cracking, "Weather-Ometer": | |
| 300 hours, aluminum channel | None |
| 300 hours, wood channel | None |
| 300 hours, glass channel | None |
| Low-Temperature Flexibility ¹⁄₁₆ to ⅛-inch on "Teflon," ½-inch rod at −30° C | Pass |
| Tensile, 2 weeks at 73° F., 50% R.H., p.s.i | 6.2 |
| Elongation, 2 weeks at 73° F., 50% R.H | 300%–400% |
| 180° Peel Adhesion:³ | |
| Yellow Pinewood, lbs. per inch | 7.0 |
| Stainless steel, lbs per inch | 9.0 |
| Aluminum, lbs per inch | 9.0 |
| Glass, lbs per inch | 7.0 |
| Glazed ceramic tile, lbs per inch | 6.0 |
| Specific volume, ml. per g | 0.65 |
| Pounds per gallon⁴ | 13.49 |

¹ "Semco" caulk gun, 50 p.s.i. air pressure through a ⅛-inch diameter nozzle orifice of a polyethylene tube.
² Canadian specification 19–GP–5a, Sec. 6.2.4.
³ 7 days at 73° F., 7 days at 88° C. Reconditioned at 73° F. All at 50% R.H. Canadian specification 19–GP–5a, Sec. 6.2.6.2. All adhesive-cohesive failure.
⁴ This value will vary slightly with the type of plasticizer used.

EXAMPLE VI

In this example there is characterized the use of wax in the manufacture of a caulk or sealant formulation. The following is a recipe for manufacturing a wax emulsion utilized hereinafter:

Weigh into a container 87 parts by weight of carnauba wax. Apply heat to melt the wax and then add 4.9 parts by weight of 98% aqueous triethanolamine solution and mix the triethanolamine together. Thereafter add 9.0 parts by weight of stearic acid and disperse the mixture well. Then the heat is withdrawn. Add carefully to the mixture in the container 400 parts by weight of water and stir the total mixture gently until the mix cools to room temperature. Adjust the total solids to the desired level with additional water or by virtue of water evaporation.

In the above wax emulsion recipe, one may substitute for triethanolamine such well known amines as monoethanolamine, and morpholine. For stearic acid, one may substitute oleic acid and any of the other fatty acids

TABLE 4

| | Formulation A¹ | | | Formulation B² | | | Formulation C³ | | |
|---|---|---|---|---|---|---|---|---|---|
| Components | Pounds | Gallons | Parts by weight | Pounds | Gallons | Parts by weight | Pounds | Gallons | Parts by weight |
| Mixture | 442.42 | 49.71 | 32.79 | 433.70 | 48.73 | 32.79 | 434.32 | 48.80 | 32.79 |
| Surfactant, "Triton"ᵃ X–405 (75% total solids) | 9.73 | 1.06 | 0.72 | 9.55 | 1.04 | 0.72 | 9.55 | 1.04 | 0.72 |
| Dispersant, "Calgon"ᵇ T | 10.86 | 0.52 | 0.81 | 10.65 | 0.51 | 0.81 | 10.65 | 0.51 | 0.81 |
| Tricresyl phosphate | 60.13 | 6.18 | 4.46 | 58.96 | 6.06 | 4.46 | 59.06 | 6.07 | 4.46 |
| Chlorinated hydrocarbon, "Aroclor"ᶜ 1254 or 6062 | 67.49 | 6.08 | 5.00 | | | | | | |
| "Paraplex"ᵃ WP-1 plasticizer | | | | 66.13 | 7.92 | 5.00 | | | |
| Tri (butoxyethoxy) phosphate | | | | | | | 66.21 | 7.79 | 5.00 |
| Solvent, "Varsol"ᵈ No. 1 | 27.64 | 4.24 | 2.05 | 27.12 | 4.16 | 2.05 | 27.12 | 4.16 | 2.05 |
| Calcium carbonate | 722.30 | 31.96 | 53.55 | 708.06 | 31.33 | 53.55 | 709.19 | 31.38 | 53.55 |
| Titanium dioxide | 8.36 | 0.25 | 0.62 | 8.36 | 0.25 | 0.62 | 8.36 | 0.25 | 0.62 |
| Total | 1,348.93 | 100.00 | 100.00 | 1,322.53 | 100.00 | 100.00 | 1,324.46 | 100.00 | 100.00 |

ᵃ Rohm and Haas Company; ᵇ Calgon Corporation; ᶜ Monsanto Corporation; ᵈ Humble Oil & Refining Company.
¹ Subject to concentrated UV color development. Exposure 360 hours at 80° F.; ² Rated medium in concentrated UV color stability. Exposure 360 hours at 80° F.; ³ Rated excellent in concentrated UV color stability. Exposure 360 hours at 80° F.

containing 18 carbon atoms. The most preferable fatty acid is stearic acid.

To the mixture of Example V of Acrylate Copolymer Latex C and Salt Copolymer, there is added the aforementioned wax emulsion recipe as an emulsion containing 13 weight percent wax therein, in the proportions indicated in the Table 6 below to produce a caulking composition based on the formulation recipe of Table 5. The properties obtained by varying the wax content is cited in Table 6.

TABLE 5

| Components | Formulation at— | | |
|---|---|---|---|
| | Pounds | Gallons | Parts by weight |
| Mixture plus wax emulsion | 578.59 | 65.01 | 47.19 |
| "Calgon"[1] water conditioner | 2.82 | 0.44 | 0.24 |
| Flexol plasticizer TCP | 53.03 | 5.45 | 4.32 |
| Chlorinated hydrocarbon, "Aroclor"[2] 1254 or 6062 | 18.98 | 1.71 | 1.55 |
| "Paraplex"[3] WP-1 plasticizer | | | |
| Flexol plasticizer TBF | | | |
| PMO-30 | 0.92 | 0.09 | 0.08 |
| Solvent, "Varsol"[4] No. 1 | 19.04 | 2.92 | 1.55 |
| Calcium carbonate extender, "Atomite"[5] | 546.69 | 24.20 | 44.59 |
| Titanium dioxide, "TiPure"[6] R-901 | 6.02 | 0.18 | 0.48 |
| Total | 1,226.09 | 100.00 | 100.00 |

[1] Calgon Coporation.
[2] Monsanto Corporation.
[3] Rohm and Haas Company.
[4] Humble Oil & Refining Company.
[5] Thompson, Weinman and Company.
[6] E. I. du Pont de Nemours & Co. (Inc.).

NOTE.—Procedure: Add the components in the order listed and mix two hours in a one-gallon "Baker-Perkins" Sigma Blade type mixer a 79 r.p.m. Enclose the mixture to prevent moisture loss.

Though this invention has been described with respect to the plurality of details thereof, it is not intended that such details shall act to limit this invention in any way.

What is claimed is:

1. An acrylic latex comprising a copolymer of at least 50 weight percent alkyl acrylate wherein the alkyl group contains up to 4 carbon atoms and the remainder of the copolymer is one of a different alkyl acrylate, styrene, methylmethacrylate, acrylonitrile, acrylic acid, methacrylic acid, maleic acid, itaconic acid, N-methylolacrylamide, vinyl acetate, vinyl chloride, gamma-hydroxypropylacrylate, beta-hydroxyethylacrylate, glycidyl acrylate, and mixtures thereof, which has dispersed therein the secondary or tertiary amine salt of an ethylene and acrylic acid copolymer of 14 to 54 weight percent acrylic acid and a melt index of at least 0.1 to about 1000 decigrams per minute, determined at 190° C.

2. The latex composition of claim 1 wherein the amine salt of the ethylene-acrylic acid copolymer is N,N-dimethylethanolamine.

3. The latex composition of claim 1, wherein there is provided therein a finely particulated filler.

TABLE 6.—180° PEEL ADHESION, TENSILE POUNDS/INCH

[Carnauba Wax emulsion, 13% total solids, added on wet weight basis to mixture of Latex C and salt copolymer]

| Tests and conditions | Percent by weight based on mixture of— | | | | | |
|---|---|---|---|---|---|---|
| | 0.81 | 1.6 | 3.2 | 4.7 | 5.8 | 6.7 |
| 1. Three-day cure at (73° F., 50% R.H.), 7-days at 80° C., ½ day at 73° F.: | | | | | | |
| (a) Wood, p.i. | 28.0 | 18.0 | 44.0 | 18.0 | 20.0 | 35.0 |
| (b) Glass, p.i. | 27.0 | | 38.0 | 24.0 | 32.0 | 29.0 |
| (c) Ceramic tile, p.i. | | | 43.0 | 39.0 | 41.0 | 40.0 |
| (d) Steel, p.i. | | | 33.0 | 26.0 | 18.0 | 30.0 |
| (e) Aluminum, p.i. | | | 40.0 | 26.0 | 21.0 | 24.0 |
| 2. No. 1 plus 7-days under water, immediate tensile: | | | | | | |
| (a) Wood, p.i. | 7.0 | 10.0 | 15.0 | 13.0 | 16.0 | 15.0 |
| (b) Glass, p.i. | a 6.0 | | a 8.0 | a 8.0 | 22.0 | a 7.0 |
| (c) Ceramic tile, p.i. | | | a 3.0 | a 5.0 | a 11.0 | a 6.0 |
| (d) Steel, p.i. | | | 27.0 | 17.0 | 16.0 | 17.0 |
| (e) Aluminum, p.i. | | | a 0.2 | 14.0 | 14.5 | 16.0 |
| 3. Tensile, p.s.i. | | 12.6 | | 9.6 | 9 | 9.6 |
| 4. Elongation, percent | | 561 | | 773 | 667 | 800 |
| 5. Shore A Hardness | | | | b 29 | c 26 | c 27 | b 25 |
| 6. Caulk heat stability, 60 days at 50° C. | | | (d) | | | | a Mostly adhesive failure.  b 30 days.  c 26 days.  d No change.

References Cited

UNITED STATES PATENTS

| 3,365,520 | 1/1968 | Foster et al. | 260—897 |
| 3,410,928 | 11/1968 | Baum | 260—897 |
| 3,485,783 | 12/1969 | Kehe | 260—27 |
| 3,600,468 | 8/1971 | Böhme | 260—897 |

WILLIAM H. SHORT, Primary Examiner

E. A. NIELSEN, Assistant Examiner

U.S. Cl. X.R.

260—29.6 WB, 29.6 PS, 41 A, 897 B

UNITED STATES PATENT OFFICE
CERTIFICATE OF CORRECTION

Patent No. 3,738,991     Dated June 12, 1973

Inventor(s) Delmer H. Reed

It is certified that error appears in the above-identified patent and that said Letters Patent are hereby corrected as shown below:

Column 7, line 8, "wth" should read --with--; line 32, "9 parts" should read --93 parts--; line 36, "15" should read --150--; line 42, after "each" insert --portion an amount of salt copolymer as specified in--; line 44, delete entire line beginning with "portion" and ending with "in".
Column 9, line 38, "cohensive" should read --cohesive--.
Column 11, line 30, "mixer a" should read --mixer at--.

Signed and sealed this 11th day of February 1975.

(SEAL)
Attest:

RUTH C. MASON
Attesting Officer

C. MARSHALL DANN
Commissioner of Patents
and Trademarks